United States Patent
Ueda

(10) Patent No.: US 12,444,242 B2
(45) Date of Patent: Oct. 14, 2025

(54) ABNORMAL SOUND DIAGNOSIS SYSTEM

(71) Applicant: TOYOTA JIDOSHA KABUSHIKI KAISHA, Toyota (JP)

(72) Inventor: Yu Ueda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 286 days.

(21) Appl. No.: 18/143,882

(22) Filed: May 5, 2023

(65) Prior Publication Data

US 2024/0029479 A1   Jan. 25, 2024

(30) Foreign Application Priority Data

Jul. 20, 2022   (JP) ................ 2022-115930

(51) Int. Cl.
*G07C 5/00* (2006.01)
*G07C 5/08* (2006.01)

(52) U.S. Cl.
CPC ............ *G07C 5/008* (2013.01); *G07C 5/085* (2013.01)

(58) Field of Classification Search
CPC ................ G07C 5/008; G07C 5/085
See application file for complete search history.

(56) References Cited

U.S. PATENT DOCUMENTS

| | | | |
|---|---|---|---|
| 2003/0225790 A1 | 12/2003 | Inoue | |
| 2004/0015251 A1* | 1/2004 | Hamada | G01M 15/12 381/56 |
| 2005/0066730 A1* | 3/2005 | Raichle | G01N 29/46 73/579 |
| 2009/0177354 A1* | 7/2009 | Agrawal | G01M 17/007 701/33.4 |
| 2016/0048811 A1 | 2/2016 | Asai et al. | |
| 2016/0071336 A1* | 3/2016 | Owen | G07C 5/0808 701/33.5 |
| 2017/0154481 A1* | 6/2017 | Chen | G07C 5/0841 |
| 2019/0114849 A1 | 4/2019 | Lee et al. | |

(Continued)

FOREIGN PATENT DOCUMENTS

| | | |
|---|---|---|
| JP | 2004-005169 A | 1/2004 |
| JP | 2014-191790 A | 10/2014 |

(Continued)

OTHER PUBLICATIONS

Basavaraj S. Anami, Veerappa B. Pagi. "Multi-stage Acoustic Fault Diagnosis of Motorcycles using Wavelet Packet Energy Distribution and ANN." Dec. 2012. International Journal of Advanced Science and Technology. vol. 49. 47-62. (Year: 2012).*

(Continued)

*Primary Examiner* — Peter D Nolan
*Assistant Examiner* — Hyang Ahn
(74) *Attorney, Agent, or Firm* — Dinsmore & Shohl LLP

(57) ABSTRACT

In a case where input of data of a part of a plurality of items needed for a diagnosis is received, an item of which data is to be input next is changed based on the received data, so that an item that can efficiently reduce the candidates for the cause of the abnormal sound can be used as the item of which the data is to be input next, according to the received data. As a result, the candidates for the cause of the abnormal sound are efficiently narrowed down, and the number of man-hours needed to specify the cause of the abnormal sound can be reduced.

6 Claims, 4 Drawing Sheets

(56) References Cited

U.S. PATENT DOCUMENTS

2020/0193291 A1* 6/2020 Lee .................. G10L 25/30
2021/0327175 A1 10/2021 Yamamura et al.

FOREIGN PATENT DOCUMENTS

JP   2020-143973 A   9/2020
JP   2021-169973 A   10/2021

OTHER PUBLICATIONS

Aniket K. Kemalkar, Vinayak K. Bairagi. "Engine Fault Diagnosis Using Sound Analysis." Sep. 2016. International Conference on Automatic Control and Dynamic Optimization Techniques (ICACDOT). pp. 943-946. (Year: 2016).*

Marwan Madain, Ahed Al-Msaiden, Mahmood Al-khassaweneh. "Fault Diagnosis in Vehicle Engines Using Sound Recognition Techniques." May 2010. IEEE International Conference on Electro/Information Technology. pp. 1-4. (Year: 2010).*

* cited by examiner

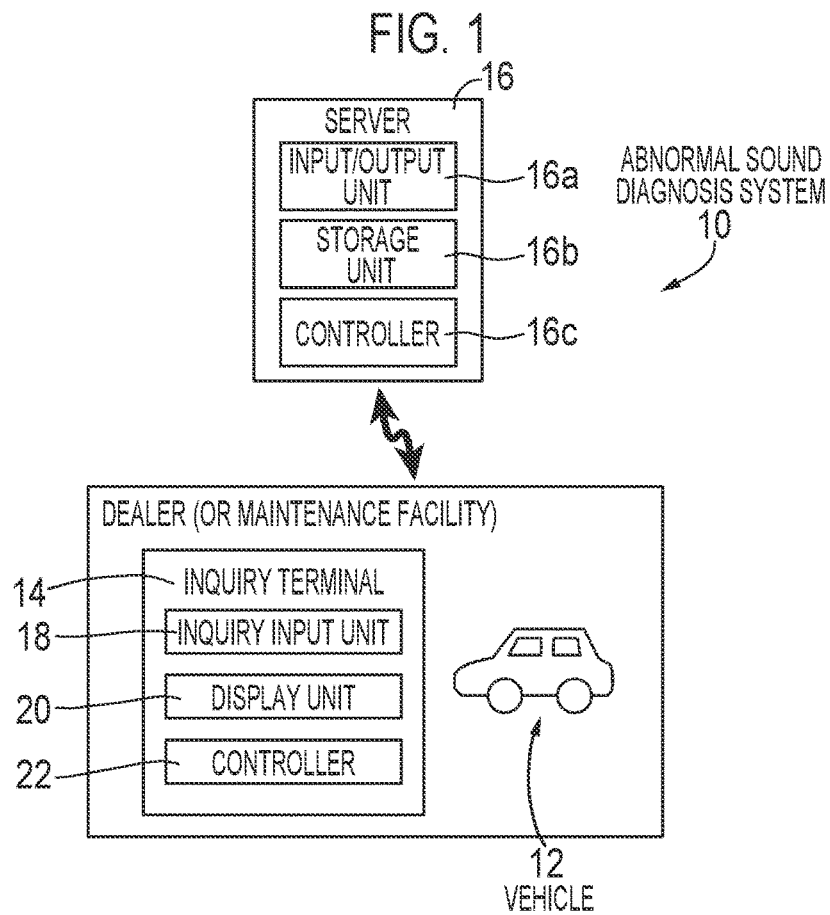

| | 1. GENERATION PART | 2. ONOMATOPOEIC WORD (FREQUENCY) | 3. DRIVING CONDITION |
|---|---|---|---|
| ABNORMAL SOUND A | FRONT SIDE OF VEHICLE (INSIDE ENGINE COMPARTMENT) | SQUEALING | WHEN ACCELERATION |
| ABNORMAL SOUND B | FRONT SIDE OF VEHICLE (INSIDE ENGINE COMPARTMENT) | SQUEALING | WHEN DECELERATION |
| ABNORMAL SOUND C | FRONT SIDE OF VEHICLE (INSIDE ENGINE COMPARTMENT) | SQUEALING | WHEN CONSTANT VEHICLE SPEED |
| ABNORMAL SOUND D | SLIDING DOOR | CLUNKING | WHEN DOOR OPERATION |
| ABNORMAL SOUND E | BACK DOOR | CLATTERING | WHEN DOOR OPERATION |
| ABNORMAL SOUND F | DOOR GLASS | CLATTERING | WHEN TRAVELING |
| ABNORMAL SOUND G | BRAKE | GROWLING | WHEN BRAKE-ON |
| ABNORMAL SOUND H | FRONT SIDE OF VEHICLE (INSIDE ENGINE COMPARTMENT) | RATTLING | WHEN ENGINE START-UP |
| ABNORMAL SOUND I | FRONT SIDE OF VEHICLE (INSIDE ENGINE COMPARTMENT) | RATTLING | WHEN START-STOP |
| ABNORMAL SOUND J | FRONT SIDE OF VEHICLE (INSIDE ENGINE COMPARTMENT) | RATTLING | WHEN ACCELERATION |

SERVER DB

ABNORMAL SOUND DIAGNOSIS SYSTEM

CROSS-REFERENCE TO RELATED APPLICATION

This application claims priority to Japanese Patent Application No. 2022-115930 filed on Jul. 20, 2022 incorporated herein by reference in its entirety.

BACKGROUND

1. Technical Field

The present disclosure relates to an abnormal sound diagnosis system for specifying a cause of an abnormal sound when the abnormal sound is generated in a vehicle.

2. Description of Related Art

When a driver senses some abnormal sounds while a vehicle is traveling, the driver brings the vehicle to a dealer or a maintenance facility, and a cause of the abnormal sound is specified based on information from the driver. Japanese Unexamined Patent Application Publication No. 2014-191790 (JP 2014-191790 A) discloses that a kind of an abnormal sound is included in options for acquiring information related to a malfunction symptom, and in a case where a content of the malfunction symptom is the kind of the abnormal sound, a sample abnormal sound based on a plurality of kinds of sample abnormal sound data stored in a storage unit of an inquiry device or an external server is output, so that a response of the driver is facilitated. Also, Japanese Unexamined Patent Application Publication No. 2021-169973 (JP 2021-169973 A) discloses that teacher data is created based on a feature amount of each evaluation sound and machine learning is executed using the teacher data to generate a learning model.

SUMMARY

By the way, in JP 2014-191790 A, for example, in a case where a large number of candidates correspond to the cause of the abnormal sound, how to narrow down the candidates for the cause of the abnormal sound is unknown. As a result, investigation as to whether or not all candidates are the cause of the abnormal sound is needed, and there is room for improvement in terms of efficiently specifying the cause of the abnormal sound. Also, JP 2021-169973 A discloses that the learning model is generated by executing the machine learning, but does not disclose anything about narrowing down the candidates for the cause of the abnormal sound.

The present disclosure has been made against the background of the above circumstances, and is to provide an abnormal sound diagnosis system that can narrow down candidates for a cause of an abnormal sound with a small number of inquiries (input of data).

An aspect of the present disclosure relates to an abnormal sound diagnosis system. (a) The abnormal sound diagnosis system is configured to specify a cause of an abnormal sound of a vehicle. (b) In a case where input of data of a part of a plurality of items needed for a diagnosis is received, an item to be input next is changed based on the received data.

According to the present disclosure, in a case where the input of the data of the part of the items needed for the diagnosis is received, the item to be input next is changed based on the received data, so that an item that can efficiently reduce the candidates for the cause of the abnormal sound can be used as the item to be input next, according to the received data. As a result, the candidates for the cause of the abnormal sound are efficiently narrowed down, and the number of man-hours needed to specify the cause of the abnormal sound can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram schematically showing an overall structure of an abnormal sound diagnosis system to which the present disclosure is applied;

FIG. 2 is a diagram showing an example of data related to an abnormal sound accumulated in a server;

DETAILED DESCRIPTION OF EMBODIMENTS

Figure 3:
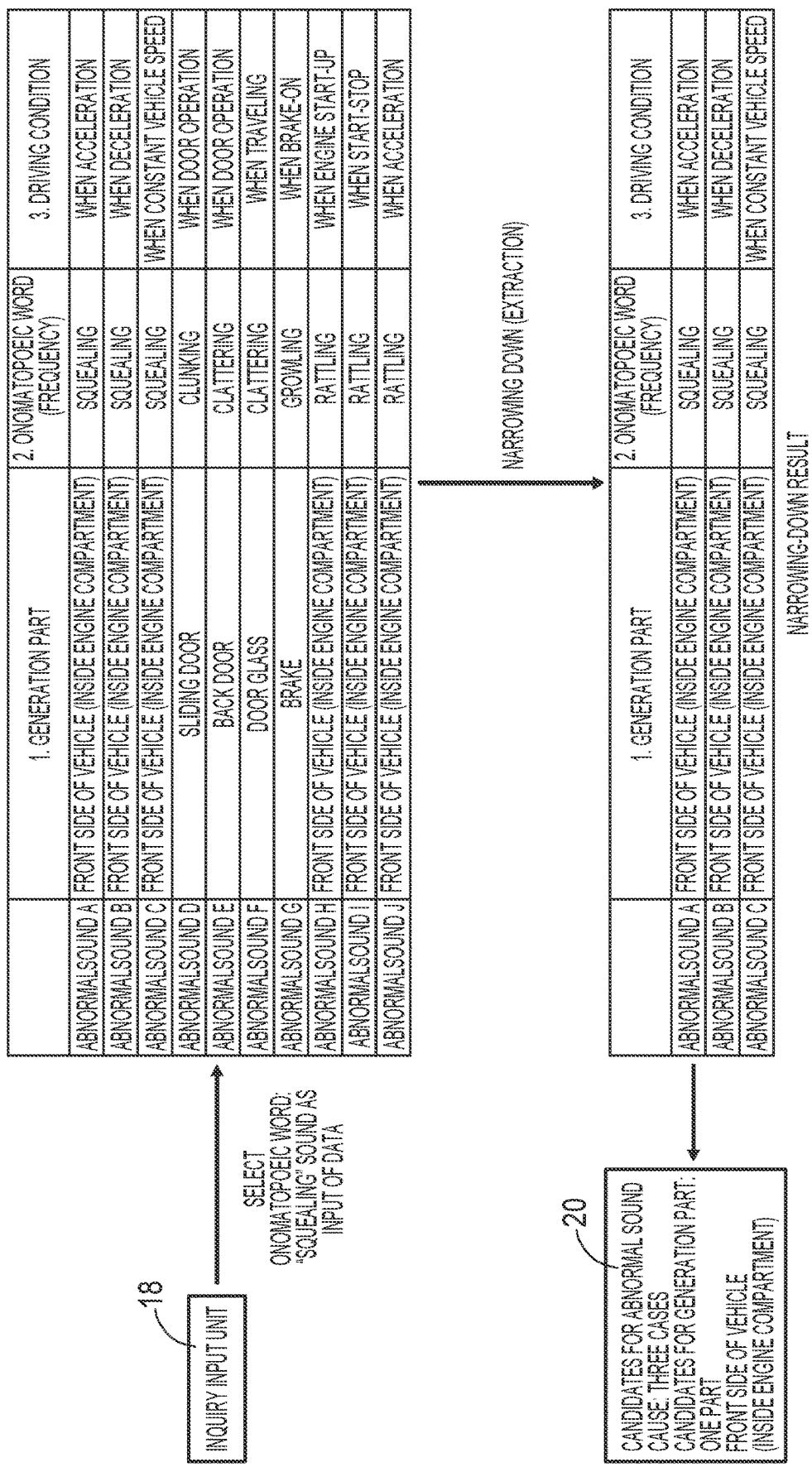
FIG. 3 is a diagram showing one aspect of a flow of narrowing down candidates for an abnormal sound cause.

Hereinafter, an embodiment of the present disclosure will be described in detail with reference to the drawings. Note that, in the following embodiment, the drawings are appropriately simplified or modified, and the dimensional ratios, shapes, and the like of each unit are not always drawn accurately.

FIG. 1 is a diagram schematically showing an overall structure of an abnormal sound diagnosis system 10 to which the present disclosure is applied. The abnormal sound diagnosis system 10 is a system that specifies a cause of an abnormal sound (hereinafter, referred to as an abnormal sound cause) when the abnormal sound is generated while a vehicle 12 is traveling. In general, when a driver senses the abnormal sound while the vehicle is traveling, the driver brings the vehicle 12 to a dealer or a maintenance facility, and detailed information related to the abnormal sound is inquired. For example, as an item to be inquired, a plurality of items, such as a generation part of the abnormal sound, a content of the abnormal sound ("squealing" sound or the like), and a driving condition when the abnormal sound is generated, needed for a diagnosis of the abnormal sound is inquired. Then, candidates for the abnormal sound cause are narrowed down based on the content of the inquired item. Also, when the candidates for the abnormal sound cause are narrowed down to a state where an operation for specifying the abnormal sound cause is executable, a notification of an operation that is executable next is specifically given, and data (specifically, sound data) obtained based on the operation is analyzed to specify the abnormal sound cause.

The abnormal sound diagnosis system 10 includes an inquiry terminal 14 and a server 16 provided in the dealer or the maintenance facility.

The inquiry terminal 14 is, for example, a personal computer or a portable terminal, such as a smartphone. The inquiry terminal 14 is connected to the server 16 through a predetermined network or the like. Therefore, the inquiry terminal 14 can transmit and receive information to and from the server 16.

The inquiry terminal 14 includes an inquiry input unit 18, a display unit 20, and a controller 22. The inquiry input unit 18 is provided to specifically input the content of the item for narrowing down the candidates for the abnormal sound cause. The inquiry input unit 18 is, for example, a keyboard of the personal computer or a touch panel of the portable terminal. The display unit 20 is provided, for example, to display the input data, to display an item to be input next, or to display the operation that is executable next. The display unit 20 is, for example, a display of the personal computer or the touch panel of the portable terminal. The controller 22 executes various controls for specifying the abnormal sound cause, such as a display control of the display unit 20 or transmission/reception of information with the server 16.

The server 16 is provided outside the vehicle 12 and is a functional device that can transmit and receive information to and from the inquiry terminal 14 through the network. The server 16 includes an input/output unit 16*a*, a storage unit 16*b*, a controller 16*c*, and the like, and receives various data, analyzes the received various data, accumulates various data, or provides various data. In the storage unit 16*b* of the server 16, for each kind of the abnormal sound (in FIG. 2, abnormal sounds A to J), the contents of the items needed for the diagnosis of the abnormal sound are stored (accumulated) in a database as big data. Specifically, as shown in FIG. 2, for each kind of the abnormal sound (abnormal sounds A to J), as the items needed for the diagnosis of the abnormal sound cause, 1. generation part, 2. onomatopoeic word (frequency), and 3. driving condition are stored and accumulated.

The generation part is, for example, a front side of the vehicle (inside an engine compartment), a sliding door, a back door, a door glass, or a brake. The onomatopoeic word is an onomatopoeic word of the abnormal sound generated during traveling, for example, the squealing sound, a clunking sound, a clattering sound, a growling sound, or a rattling sound. The driving condition is a driving state when the abnormal sound is generated, for example, when acceleration, when deceleration, when constant vehicle speed, when door operation, when brake-ON, when engine start-up, when start-stop. Also, in addition to these three items, more items, such as date and time, weather, temperature, and location when abnormal sound is generated may be accumulated.

The server 16 has a function of, in a case where the data input by the driver or a person in charge (same meaning as a worker) is received when the abnormal sound cause is specified, appropriately changing the item of which the data is to be input next, based on the received data. Specifically, as the item of which the data is to be input next, for example, data (for example, the sound data) that can efficiently reduce the candidates for the abnormal sound cause or that can specify the abnormal sound cause is selected.

FIG. 3 is a diagram showing a flow of narrowing down the candidates for the abnormal sound cause in a case where the driver or the person in charge inputs the onomatopoeic word of the "squealing" sound as the first input data. First, when the driver or the person in charge inputs the onomatopoeic word of the "squealing" sound through the inquiry input unit 18, the "squealing" sound is received by the server 16, and is collated with the onomatopoeic word for each kind of the abnormal sound that is stored (accumulated) in the storage unit 16*b* of the server 16 and shown in the upper right of FIG. 3 (or FIG. 2). In this case, the abnormal sounds A to C shown in the lower right of FIG. 3 are extracted as the candidates for the abnormal sound cause corresponding to the onomatopoeic word of the "squealing" sound.

Here, in the abnormal sounds A to C, the contents of the generation part among the items for specifying the abnormal sound cause are common, as the front side of the vehicle (inside the engine compartment). That is, in the abnormal sounds A to C, the contents of the generation part and the onomatopoeic word are common, and solely the driving conditions are different from each other. As described above, since the generation parts are common, in a case where the sound data of the front side of the vehicle (inside the engine compartment) that is the generation part is measured and analyzed, a possibility that the abnormal sound cause can be specified is increased. That is, the candidates for the abnormal sound cause have been narrowed down to the state where the operation for specifying the cause of the abnormal sound is executable. In this case, the server 16 selects the sound data (measurement value) obtained by measuring the sound generated in the front side of the vehicle (inside the engine compartment) as the item of which the data is to be input next. In this regard, the controller 22 measures the sound data in the front side of the vehicle (inside the engine compartment) and causes the display unit 20 to display that the measured sound data (measurement result) is to be input. Note that the measurement of the sound data corresponds to the operation for specifying the cause of the abnormal sound according to the present disclosure, and the sound data corresponds to the measurement value obtained based on the operation of the present disclosure.

For example, as shown in the lower left of FIG. 3, the number of candidates for the abnormal sound cause (three cases in FIG. 3), the number of candidates for the generation part (one part), and a specific generation part (front side of the vehicle (inside the engine compartment)) are displayed on the display unit 20. Further, the display unit 20 displays that the item of which the data is to be input next is the sound data in the front side of the vehicle (inside the engine compartment), and that a microphone is set around the engine to measure the sound when the sound data is measured. In this way, the person in charge is notified of the item of which the data is to be input next and the operation that is executable when the sound data corresponding to the item of which the data is to be input next is measured. Accordingly, the person in charge sets a plurality of microphones around the engine to measure the sound, and the measured sound data (measurement result) is input from the inquiry input unit 18. The sound data is received by the server 16, the sound data is analyzed by the server 16, and the abnormal sound cause is specified based on the analysis result.

Also, even in a case where, for example, the driving conditions are common in the candidates for the abnormal sound cause extracted based on the input of the data, that is, even in a case where the driving conditions are narrowed down to one, similarly, a determination is made that the candidates for the abnormal sound cause have been narrowed down to the state where the operation for specifying the cause of the abnormal sound is executable. In this case, the driving condition is displayed on the display unit 20, and the display unit 20 further displays that the sound of each part is measured under the same driving condition, and the sound data measured in each part under the same driving condition is input. According to the display content, the person in charge measures the sound and inputs the measured sound data. The sound data is received by the server 16 and analyzed by the server 16, so that the abnormal sound cause is specified based on the analysis result. In this way, in a case where the candidates for the abnormal sound cause are narrowed down to a state where the operation for specifying the abnormal sound cause is executable, the data (measurement value) obtained based on the operation, such as the sound data, is selected as the item of which the data is to be input next.

In the aspect described above, in a case where the input of the data of any of the items needed for the diagnosis is received, the extracted candidates for the abnormal sound cause are narrowed down to the state where the operation for specifying the abnormal sound cause is executable. However, since the number of extracted candidates for the abnormal sound cause is large, further narrowing down the candidates may be needed. In such a case, when the candidates for the abnormal sound cause are further narrowed down, an item having a possibility that the candidates for the abnormal sound cause are able to be most reduced, that is, an item that can efficiently reduce the candidates for the abnormal sound cause is selected as the item of which the data is to be input next. In the present embodiment, the items correspond to 1. generation part, 2. onomatopoeic word, and 3. driving condition.

Figure 4:
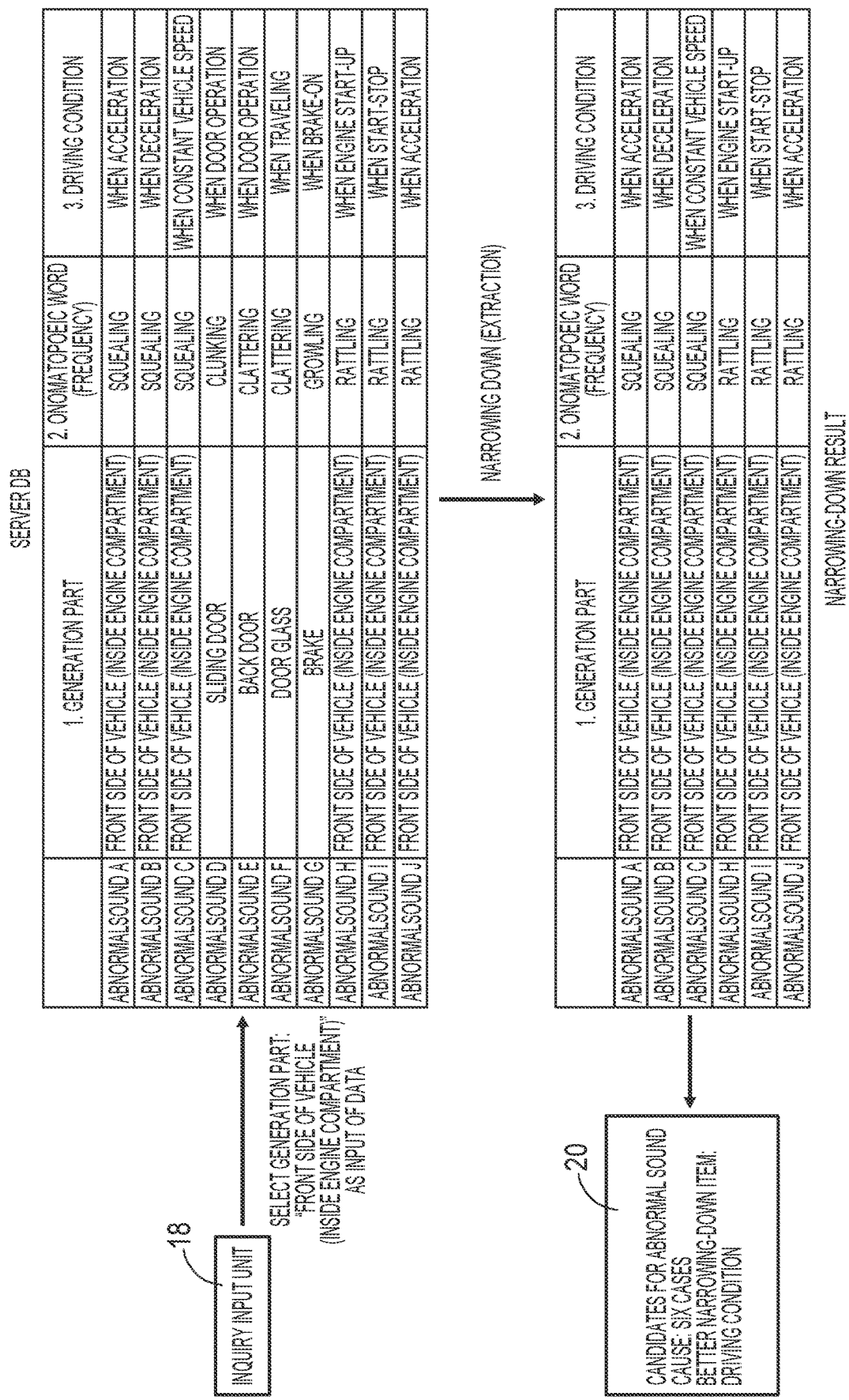
FIG. 4 is a diagram showing one aspect of a flow of narrowing down the candidates for the abnormal sound cause, and is a diagram showing a different aspect from FIG. 3.

FIG. 4 is a diagram showing the flow of narrowing down the candidates for the abnormal sound cause in a case where the driver or the person in charge inputs "the front side of the vehicle (inside the engine compartment)" as the generation part. When "the front side of the vehicle (inside the engine compartment)" is received as the generation part among the items, the server 16 subsequently executes the collation with the database of the kind of the abnormal sound accumulated in the server 16 shown in the upper right of FIG. 4. In this case, as the candidates for the abnormal sound cause corresponding to "the front side of the vehicle (inside the engine compartment)" that is the generation part, six of the abnormal sounds A to C and the abnormal sounds H to J shown in the lower right of FIG. 4 are extracted by the server 16.

Next, the server 16 selects the item of which the data is to be input next when the six extracted candidates for the abnormal sound cause are further narrowed down. Here, depending on the item to be input next, narrowing down the candidates for the abnormal sound cause to one or greatly reducing the number of candidates is desirable from the viewpoint of reducing the number of man-hours spent to specify the abnormal sound cause. Therefore, the server 16 selects the item having the possibility that the candidates for the abnormal sound cause are able to be most reduced when the data is input next, that is, the item that can reduce the work for specifying the abnormal sound cause.

In FIG. 4, the six candidates (abnormal sounds A to C, and abnormal sounds H to J) are extracted by inputting the front side of the vehicle (inside the engine compartment) as the generation part. In a case where, for example, the onomatopoeic word is input as the item to be input next from the above state, the candidates for the abnormal sound cause are narrowed down to three. Specifically, in a case where the "squealing" sound is input as the onomatopoeic word, the candidates are narrowed down to the three abnormal sounds A to C. Also, when the "rattling" sound is input as the onomatopoeic word, the candidates are narrowed down to the three abnormal sounds H to J. Therefore, further narrowing down the candidates for the abnormal sound cause is needed.

On the other hand, in a case where the driving condition is input as the item to be input next, there is a possibility that the candidates for the abnormal sound cause are narrowed down to one. For example, in a case where "when deceleration", "when constant vehicle speed", "when door operation", "when engine start-up", and "start-stop" are input as the driving condition, the candidates for the abnormal sound cause are narrowed down to one. On the other hand, in a case where "when acceleration" is input as the driving condition, the candidates for the abnormal sound cause are narrowed down to two.

Taking the above description into consideration, since the possibility that the candidates for the abnormal sound cause are narrowed down to one is high when the driving state is input next, the server 16 selects the driving state as the item of which the data is to be input next. Next, the server 16 outputs, to the inquiry terminal 14, a command for inputting the driving state as the item of which the data is to be input next. Accordingly, the display unit 20 of the inquiry terminal 14 displays that the driving state is the item of which the data is to be input next.

In a case where the item of which the data is to be input next is selected, for example, a score is set for each content of the item to be input, and the server 16 selects an item having a high total score among the items as the item of which the data is to be input next. In the present embodiment, the score is one point for the content in which the candidates are narrowed down to one, and the score is zero points for the content in which the candidates cannot be narrowed down to one. In a state where the six candidates shown in the lower right of FIG. 4 are extracted, for example, in a case where the "squealing" sound is selected as the onomatopoeic word, the candidates cannot be narrowed down to one. Therefore, the score for the "squealing" sound is zero points. Similarly, even in a case where the "rattling" sound is selected as the onomatopoeic word, the candidates cannot be narrowed down to one, so that the score for the "rattling" sound is also zero points. As a result, the total score for the onomatopoeic word is zero points.

On the other hand, in a case where "when deceleration" is selected as the driving condition, the candidates are narrowed down to one. Therefore, the score for "when deceleration" is one point. In a case where "when constant vehicle speed" is selected as the driving condition, the candidates are narrowed down to one, so that the score of "when constant vehicle speed" is one point. In a case where "when engine start-up" is selected as the driving condition, the candidates are narrowed down to one, so that the score for "when engine start-up" is one point. In a case where "start-stop" is selected as the driving state, the candidates are narrowed down to one, so that the score for "start-stop" is one point. On the other hand, in a case where "when acceleration" is selected as the driving condition, the candidates are two. In this case, since the candidates cannot be narrowed down to one, the score for "when acceleration" is zero points. As a result, the total score for the driving condition is four points.

The server 16 compares the total score (zero points) of the onomatopoeic word with the total score (4 points) of the driving condition, and selects the driving condition having a higher total score as the item of which the data is to be input next. By setting the score for each content of each item as described above, the item of which the data is to be input next can be easily selected based on the score. Note that, in the present embodiment, the score in a case where the candidates are narrowed down to one is one point, and the score in a case where the candidates are narrowed down to two or more is zero points, but a method of giving the score can be appropriately set. The method of giving the score can be appropriately changed, for example, the score in a case where the candidates are narrowed down to one is two points, the score in a case the candidates are narrowed down to two is one point, and the score in a case the candidates are narrowed down to three or more is zero points.

In the aspect described above, the score is set for each content of each item, but the item of which the data is to be input next may be selected by using, for example, artificial intelligence (AI). For example, the item having the possibility that the number of candidates is able to be most reduced may be learned as the item of which the data is to be input next, by machine learning using a neural network, and in a case where the input of the data of any item is received, the item having the possibility that the number of candidates is able to be most reduced for the abnormal sound cause may be selected based on the input data.

Figure 5:
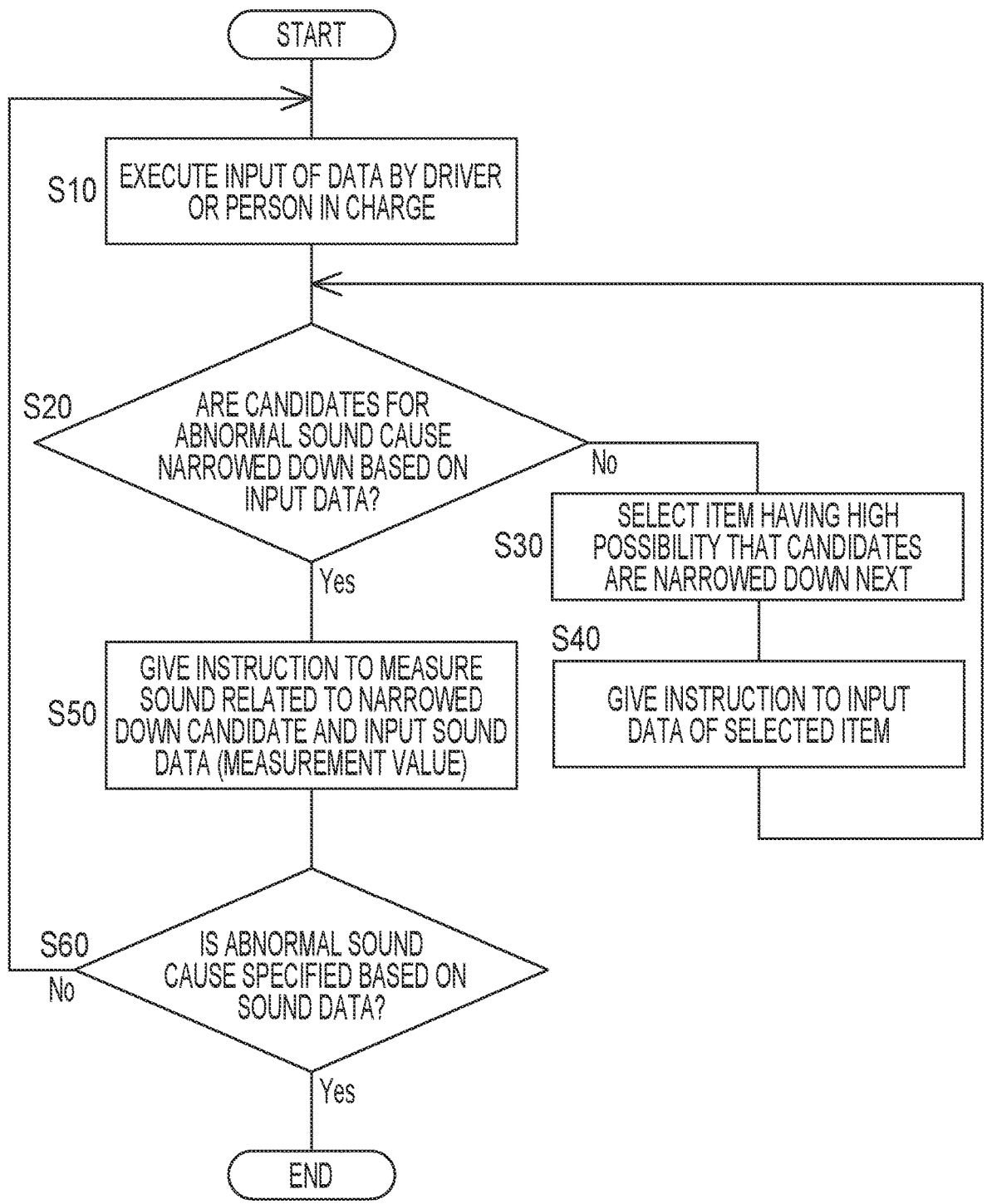
FIG. 5 is a flowchart for describing a flow of operations up to specifying the abnormal sound cause using the abnormal sound diagnosis system.

FIG. 5 is a flowchart for describing a flow of operations up to specifying the abnormal sound cause using the abnormal sound diagnosis system 10.

In FIG. 5, in step (hereinafter, step is omitted) S10, the data is input by the driver or the person in charge using the inquiry input unit 18. In the first input of the data, for example, an item that the driver is most concerned about is input. Next, in S20, the candidates for the abnormal sound cause are narrowed down based on the data input in S10, and a determination is made as to whether or not a state is the state where the operation for specifying the abnormal sound cause (for example, measurement of the sound) is executable. In a case where a positive determination is made in S20, the operations after S50 to be described below are executed. In a case where a negative determination is made in S20, in S30, the item having a high possibility that the candidates are narrowed down next is selected. Next, in S40, an instruction to input the item selected in S30 is displayed on the display unit 20. In this regard, the step in S20 is executed again after the instructed input of the data of the item is executed. In a case where a positive determination is made in S20, in S50, an instruction to measure the sound related to the narrowed down candidates and input the sound data (measurement value) is displayed on the display unit 20. In S60, a determination is made as to whether or not the abnormal sound cause is specified based on the input measurement result. In a case where a positive determination is made in S60, the routine is terminated. On the other hand, in a case where a negative determination is made in S60, the process returns to S10, and the process is executed again from the input of the data of the item different from the initial input of the data. In this way, in a case where the input of the data of a part of the items needed for the diagnosis is received, the item of which the data is to be input next is appropriately changed based on the received data.

As described above, according to the present embodiment, in a case where the input of the data of the part of the items needed for the diagnosis is received, the item of which the data is to be input next is changed based on the received data, so that an item that can efficiently reduce the candidates for the cause of the abnormal sound can be used as the item of the data is to be input next, according to the received data. As a result, the candidates for the cause of the abnormal sound are efficiently narrowed down, and the number of man-hours needed to specify the cause of the abnormal sound can be reduced.

Also, in a case where the input of the data of the part of the items is received, when the candidates for the abnormal sound cause are narrowed down to the state where the operation for specifying the abnormal sound cause is executable, the sound data (measurement value) obtained based on the operation is selected as the item of which the data is to be input next, so that the abnormal sound cause can be specified based on the sound data obtained based on the operation. Also, in a case where the input of the data of the part of the items is received, the item having the possibility that the candidates for the abnormal sound cause are able to be most reduced is selected as the item of which the data is to be input next, so that the candidates for the abnormal sound cause are efficiently narrowed down.

Heretofore, the embodiment of the present disclosure has been described in detail based on the drawings, but the present disclosure is also applied to other aspects.

For example, in the embodiment described above, in a case where the input of the data of any of the items needed for the diagnosis is received, the server 16 appropriately selects and changes the item of which the data is to be input next, based on the received data. However, the inquiry terminal 14 (controller 22) may appropriately select and change the item of which the data is to be input next. That is, the process according to the present disclosure may be executed by any of the server 16 and the inquiry terminal 14, and may be appropriately shared for each content of the process.

Note that the above description is merely one embodiment, and the present disclosure can be carried out in an aspect in which various changes and improvements are made based on the knowledge of those skilled in the art.

What is claimed is:

1. An abnormal sound diagnosis system, comprising:
a server, the server comprising a controller; and
an inquiry terminal, wherein:
the controller is configured to specify a cause of an abnormal sound of a vehicle, wherein, in a case where input of data of a part of a plurality of items needed for a diagnosis is received, an item of which data is to be input next is changed based on the received data,
the inquiry terminal is configured to measure, via a plurality of microphones around an engine of the vehicle, a sound generated in a portion of the vehicle as the item of which the data is to be input next, and cause a display to display and transmit measured sound data via the plurality of microphones and associated with the sound to the controller,
the controller is configured to select the measured sound data obtained and transmitted from the inquiry terminal,
in a case where the input of the data of the part of the plurality of items is received, the controller is configured to select an item of the plurality of items having a possibility that candidates for the cause of the abnormal sound are able to be most reduced as the item of which the data is to be input next,
a first item of the plurality of items includes a plurality of first contents and a second item of the plurality of items includes a plurality of second contents,
the controller is configured to set a first score as one point for one of the plurality of first contents or the plurality of second contents in which the candidates are narrowed down to one,
the controller is configured to set a second score for one of the plurality of first contents or the plurality of second contents in which the candidates are not narrowed down to one,
the controller is configured to sum up the first score in the first item and the second score in the second item, and
the controller is configured to select the item of the plurality of items having a highest total score as the item of which the data is to be input next.

2. The abnormal sound diagnosis system according to claim 1, wherein, in a case where the input of the data of the part of the items is received, when candidates for the cause of the abnormal sound are narrowed down to a state where an operation for specifying the cause of the abnormal sound is executable, the controller is configured to select a measurement value obtained based on the operation as the item of which the data is to be input next.

3. The abnormal sound diagnosis system according to claim 1, wherein the controller is further configured to store the items for each kind of the abnormal sound, wherein the kinds of the abnormal sound stored in the controller are collated to extract candidates for the cause of the abnormal sound.

4. The abnormal sound diagnosis system according to claim 1, wherein the plurality of items for the diagnosis of the cause of the abnormal sound includes a generation part, a frequency of the sound, and a driving condition.

5. The abnormal sound diagnosis system according to claim 4, wherein the generation part includes a front side of the vehicle, a sliding door, a back door, door glass, and a brake.

6. The abnormal sound diagnosis system according to claim 4, wherein the driving condition includes when the vehicle is accelerating, when the vehicle is decelerating, when the vehicle is traveling at a constant speed, when a door is operated, and when the engine is started.

* * * * *